3,353,987
PROCESS OF PREPARING FILMY ADHESIVE
Kazuo Manaka and Tamotsu Tomioka, Kawasaki-shi, Japan, assignors to Tokyo Shibaura Electric Co., Ltd., Kawasaki-shi, Japan, a corporation of Japan
No Drawing. Filed Dec. 26, 1963, Ser. No. 333,713
Claims priority, application Japan, Dec. 26, 1962, 37/57,781
4 Claims. (Cl. 117—47)

ABSTRACT OF THE DISCLOSURE

A process for preparing a filmy adhesive in which an epoxy monomeric compound is grafted on a polyamide resin film which comprises applying one of (1) an epoxy monomeric compound or (2) a phenol resin to said polyamide resin film, irradiating the film with a high energy radiation and then applying thereto the other of compounds (1) or (2) as recited, or which comprises applying both an epoxy monomeric compound and a phenol resin to said polyamide film before or after irradiation of the film with a high energy radiation.

---

This invention relates to a process of preparing a filmy adhesive.

A solid lumpy adhesive and filmy adhesive both obtained by melting a mixture of a polyamide resin such as nylon and a novolak phenol resin are described respectively, in Japanese Patent No. 184,177, and Japanese Patent No. 296,976. Those adhesives are characterized by a combination of the toughness of the polyamide resin and the adhesion of the phenol resin. Since those adhesives are thermoplastic, and of the so-called hot melt type, they need no curing in use. However, the simplicity of use is offset by a natural disadvantage that the adhesives are not sufficiently resistant to heat.

It has also been known that a polyamide resin such as nylon can be combined with an epoxy resin to form an adhesive, because the polyamide resin acts effectively as a curing agent for the epoxy resin. However, nylon has so few $=NH$ or $-NH_2$ groups in the molecule that it fails to give a high curing effect, and generally the above mixture has to be treated at a higher temperature than the melting point of the nylon in order to acquire the desired curing effect, and this is a great disadvantage in practice.

The present invention has for its object provision of a cure-type adhesive free from the above disadvantages and having good thermal resistance and adhesion and also increased curability, through the combination of a graft copolymer of a polyamide resin and an epoxy resin, with a resin containing hydroxyl groups.

To illustrate the invention in further detail, a film of polyamide resin and an epoxy compound containing an unsaturated group, e.g., vinyl group, in the molecule are suitably irradiated with high energy particle or electromagnetic radiation such as alpha, beta, gamma, neutron, or X-rays thereby to effect graft copolymerization, and the graft copolymer obtained is then combined with a resin containing a hydroxyl group, such as a phenol resin, thereby to prepare an adhesive which has not only good thermal resistance and adhesion but is readily curable at relatively low temperatures.

The graft copolymerization of the polyamide resin and epoxy compound by irradiation may be carried out, for example, by placing a nylon film in a glass receptacle, introducing a solution in an organic solvent of an epoxy compound containing a vinyl group into said vessel, de-aerating the receptacle thoroughly while said two reacting matters coexist therein, hermetically sealing said receptacle, and then irradiating said receptacle. Alternatively, it may be effected by first irradiating a polyamide resin film, and immediately thereafter applying an epoxy compound to said film by dipping, brushing, or other suitable fashion. In the latter case, presence of oxygen tends to oxidize the free radicals formed by the irradiation and results in a multi-stage operation of the graft copolymerization. Therefore, every effort possible should be made to prevent oxidation of the free radicals.

Also, the hydroxyl group-containing resin may be added by dissolving it in a suitable solvent and then applying the solution to said graft copolymer, or by dissolving said resin together with the epoxy compound in a suitable solvent at the time said graft copolymer is formed, or further by mixing in the polyamide resin to form a mixture solution beforehand.

The adhesive prepared by the process of the present invention not only has excellent thermal resistance and adhesion, but has remarkably improved curability due to the action of the hydroxyl group of the resin added. In accordance with the procedure as above described, (A) a graft copolymer of 6.6-nylon and glycidyl acrylate, and (B) a graft copolymer of 6.6-nylon and glycidyl acrylate with novolak phenol resin applied thereto and dried altogether, were both heated at 200° C. for 10 min., and then their infrared absorption spectra were determined. Upon comparison of the spectra, it was observed that there was a notable decrease in the epoxy group in (B) and that, whereas (A) was gelled at 250° C., (B) began to gell at 200° C. or before the nylon was melted. The above illustrate the remarkable contribution of the hydroxyl group to the epoxy group-curing reaction.

Presumably, in this case, a trimolecular substitution reaction is effected wherein the amine group of the graft copolymer acts to push the epoxide ring in the same copolymer, and the —OH group of the resin added acts to pull out the epoxide ring in the transition state through the formation of a hydrogen bond, and thus the curing is promoted. Moreover, the curing reaction is carried on further between the amine group of the polyamide resin and the epoxy group of the epoxy compound combined by graft copolymerization as above. Therefore, unlike a mere combination of, for example, polyamide resin and epoxy resin, a reticular structure is remarkably developed in the combination according to the present invention, in concert with the action of said hydroxyl group, thereby providing a product having far better thermal resistance and adhesion than ordinary ones.

Polyamide resins available for the process of the invention are 6-nylon, 6.6-nylon, 6.10-nylon, 10.6-nylon, 10.10-nylon and their copolymers. Of those nylons, 6-nylon is preferred with respect to thermal resistance because of its relatively high melting point. Aside from the above nylons, generally those polyamide resins which have such functional groups as $\equiv N$, $=NH$, and $-NH_2$ groups in the molecule and have film-forming ability can of course serve the purpose of the invention. Hydroxyl group-containing resins useful under the invention include novolak- or resole-type phenol resins formed of phenol and formaldehyde, bisphenol-A-formaldehyde resin made of bisphenol A and formaldehyde, and other phenolic resins containing phenolic hydroxyl groups, and also such other hydroxyl group-containing resins as silicone resin.

Epoxy compounds for use in the process of the invention may be monomers containing unsaturated groups, for example, glycidyl acrylate, glycidyl methacrylate, vinyl cyclohexene monoxide, and allyl glycidyl ether. Also, solvents which may be used for said graft copolymerization or at the time when the hydroxyl group-containing resin is added to the reaction system include a large number of organic solvents, e.g. dimethyl formamide, tetrahydrofuran, methanol, ethanol, acetone, and benzene.

Example 1

A 0.02 mm.-thick 6.6-nylon film and a methanol solution of 5% (by weight) of glycidyl acrylate were introduced into a glass receptacle in a state of coexistence. Then, said receptacle was thoroughly deaerated, sealed hermetically, and irradiated with gamma rays from a source of 60 Co, to provide a dosage of about $1 \times 10^5$ r. Thereafter, said film was taken out of the receptacle, washed with methanol, and dried. An acetone solution containing 10% (by wegiht) of a resole-type phenol resin was applied to the complex film formed as above, and dried, thereby to prepare a filmy adhesive. This filmy adhesive was sandwiched between metal plates, and heated at 200° C. for 2 min. under pressure. The metallic plates were bonded solidly.

In the above procedure, the solution of glycidyl acrylate was applied, gamma rays were applied, and thereafter the solution of the resole-type phenol resin was applied, all to both sides of the 6.6-nylon film. It is of course possible, however, to apply the solutions to either side alone.

Example 2

A mixture of 6% of novolak-type phenol resin and 94% of commercially obtained polyhexamethylene adipamide, both by weight, was placed in an extruder, and kept at a temperature of 260° C. for thorough mixture and melting of said two resins. Then, a 0.02 mm.-thick polyamide film was formed of the melt by means of T-shaped dies.

The film was irradiated with an electron beam from a Van de Graaff electron beam accelerator, to have a dosage of about $1 \times 10^6$ rads. Immediately thereafter, the film was dipped in a benzene solution of 5% (by weight) of glycidyl methacrylate for graft copolymerization, taken out of the bath, washed with benzene, and dried. A filmy adhesive was prepared.

This filmy adhesive was tested in the same manner as described in Example 1, with similar results.

What we claim is:

1. A process of preparing a filmy adhesive which comprises irradiating with high energy radiation a polyamide resin film having in association therewith a solution of an epoxy monomeric compound selected from the group consisting of glycidyl acrylate and glycidyl methacrylate, thereby effecting the graft polymerization of the polyamide resin and the epoxy monomeric compound to form a complex film, and thereafter applying a solution of a phenol resin selected from the group consisting of novolak and resole phenolic resins to the surface of said complex film.

2. A process of preparing a filmy adhesive which comprises forming a film of a mixture consisting essentially of a polyamide resin and a phenol resin selected from the group consisting of novolak and resole phenolic resins, irradiating said film with high energy radiation and immediately thereafter applying a solution of an epoxy monomeric compound selected from the group consisting of glycidyl acrylate and glycidyl methacrylate to the surface of said film, thereby effecting the graft polymerization of said polyamide resin and said epoxy monomeric compound, washing said polymerized film with a solvent and drying.

3. A process of preparing a filmy adhesive which comprises forming a film of a mixture consisting essentially of a polyamide resin and a phenol resin selected from the group consisting of novolak and resole phenolic resins, applying a solution of an epoxy monomeric compound selected from the group consisting of glycidyl acrylate and glycidyl methacrylate to the surface of said film and irradiating said surface with high energy radiation, thereby effecting the graft polymerization of said polyamide and said epoxy monomeric compound.

4. A process of preparing a filmy adhesive which comprises applying a mixed solution consisting essentially of an epoxy monomeric compound selected from the group consisting of glycidyl acrylate and glycidyl methacrylate and a phenol resin selected from the group consisting of novolak and resole phenolic resins to a polyamide resin film, and irradiating the surface of the film with high energy radiation, thereby effecting the graft polymerization of said polyamide resin and said epoxy monomeric compound.

References Cited

UNITED STATES PATENTS

| | | | |
|---|---|---|---|
| 2,662,865 | 12/1953 | Beauchamp | 260—841 X |
| 2,683,130 | 7/1954 | D'Alelio | 117—138.8 X |
| 2,764,502 | 9/1956 | Emerson | 117—161 X |
| 2,907,675 | 10/1959 | Gaylord | 117—47 |
| 2,956,899 | 10/1960 | Cline | 117—47 |
| 3,101,275 | 8/1963 | Cairns et al. | 117—47 |
| 3,115,418 | 12/1963 | Magat et al. | 117—47 |
| 3,261,884 | 7/1966 | Gorton | 260—841 |

WILLIAM D. MARTIN, *Primary Examiner.*

R. HUSACK, *Assistant Examiner.*